Jan. 13, 1942.   D. HERING   2,269,717
WELL SURVEYING DEVICE
Filed Dec. 13, 1940
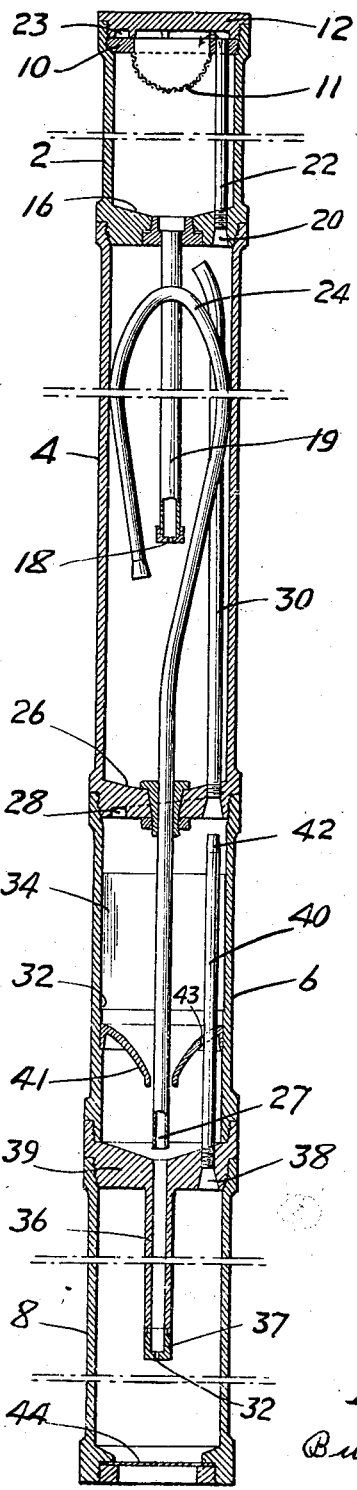
INVENTOR
Donald Hering
BY
Busser + Harding
ATTORNEYS.
WITNESS:
Robt P Kitchel.

Patented Jan. 13, 1942

2,269,717

UNITED STATES PATENT OFFICE 2,269,717

WELL SURVEYING DEVICE

Donald Hering, South Gate, Calif., assignor to Sperry-Sun Well Surveying Company, Philadelphia, Pa., a corporation of Delaware Application December 13, 1940, Serial No. 370,009

2 Claims. (Cl. 33—205.6)

This invention relates to a well surveying device of the type adapted to be lowered into a bore hole and arranged to give a suitable record of the inclination of the hole at a given point. Specifically, the invention relates to the type of well surveying instrument in which the record is made by causing a marking of a cylindrical record sheet by an ink or dye solution.

There has been in extensive use a type of instrument illustrated in the patent to Winn 2,134,808, dated November 1, 1938, in which an ink or dye solution is caused to flow from a supply chamber into an intermediate chamber through a calibrated orifice. The liquid slowly rising in the intermediate chamber eventually reaches the bend of a siphon located in that chamber and is rapidly discharged therefrom into a record chamber containing a cylindrically arranged sheet of paper on which the record is made in the nature of a line marking the intercept with the sheet of the surface of the liquid. The record chamber is also provided with a siphon which, after the record is made, rapidly discharges the liquid from the record chamber, so that subsequent manipulations of the instrument will not destroy the accuracy of the record.

In the operation of this instrument, there was poured into the supply chamber while the instrument was in upright position either ink previously used and retrieved from the receiving chamber into which it was discharged from the record chamber, or a new supply of ink. Following the placing of the ink in the chamber, the top of the instrument had to be replaced and it had to be located within a pressure type protective casing for lowering into the well. As soon as the liquid was located in the supply chamber, it began to run through the calibrated orifice. Accordingly, the timing had to be such as to delay the making of a record for a period including the time required for introduction of the ink or dye and the closing of the apparatus.

At the end of the operation of the device it was necessary to pour out the remaining fluid in the receiving chamber, as well as that remaining in the delivery chamber, into a supply bottle. When preparing the instrument for the next operation, the fluid had to be poured from this bottle into a measuring cup and from this the required quantity had to be poured into the instrument.

One object of the present invention is to provide an apparatus of this general character in which operation is initiated merely by turning the instrument from an inverted to an upright position, the supply of liquid being normally maintained in the supply chamber while the instrument is inverted. Additionally, the improved instrument is preferably so arranged that after a record is made and the ink or dye is in the bottom receiving chamber, the instrument may be inverted to cause the ink or dye to flow back to the supply chamber without marring the record. Then as long as the instrument remains in inverted position no operation will occur, but a successive operation may be effected after cleaning the record chamber and replacement of the record sheet therein merely by reversing the instrument to an upright position.

By reason of this improved simpler method of initiating operation of the apparatus, the time delay which must be provided by the orifice is reduced, with a consequent possibility of using a larger orifice less likely to become clogged by any sediment. Additionally, considerable time is saved in that special manipulation of the liquid is not required. The apparatus is preferably arranged so that filtering of the ink or dye takes place between operations. Since little coloring matter is removed from the ink or dye in each operation, a single charge may be used many times.

The above and subsidiary objects relating particularly to details, will be apparent from the following description, read in conjunction with the accompanying drawing, in which the figure represents in vertical section the internal parts of a well surveying instrument embodying the improvements indicated above.

As in the case of the apparatus of said Winn patent, the instrument is provided with a series of cylindrical chambers comprising a supply chamber 2, and intermediate chamber 4, a record chamber 6 and a receiving chamber 8. These chambers may be secured together by suitable packed screw joints, which may be of any desired form.

Within the upper portion of the supply chamber 2 there is located a ring 10 carrying a strainer 11. The ring 10 is provided with an opening adapted to receive tightly the upper end of one of the return and venting tubes 22 hereafter described, a screw cap or plug 12 over the ring and closing the upper end of the supply chamber 2 being provided with a channel and outlets as indicated at 23 to furnish communication between the tube 22 and the interior of the strainer. The strainer or filter 11 may be of fine mesh wire or other suitable porous material designed to remove sediment either from the colored liquid initially charged into the instrument or from that returned to the supply chamber following an operation.

The instrument made up of the cylindrical sections just described is adapted to be located within a pressure resisting protective casing of conventional type, as illustrated in said Winn patent. Preferably rubber or other elastic cushions are provided at the ends of the instrument to prevent damage, particularly when the instrument is used in go-devil fashion.

The bottom 16 of the supply chamber 2 is provided with a removable and replaceable calibrated orifice indicated at 18 at the lower end of a tube 19. This orifice is made removable so that for any operation of the instrument a suitable orifice may be placed therein to secure the proper time delay for the conditions of use.

The bottom 16 of the supply chamber is provided with an opening 20 of inverted funnel shape into which there is threaded the upwardly extending tube 22.

Within the intermediate chamber 4 there is located the upper bent end of a siphon 24 which extends downwardly through the bottom 26 of the chamber 4 and terminates at 27 near the bottom of the record chamber. The bottom 26 of this intermediate chamber is provided with an annular groove 28 from which there extends a tapped opening receiving a tube 30 which opens at a point adjacent the top of the chamber 4, out of alignment with the tube 22.

The record chamber 6 is provided with a ledge, indicated at 32, on which is adapted to rest the record sheet 34 on which a record is made by the liquid in the fashion described in said Winn patent. While there may be provided as in the case of the Winn patent a second siphon within the record chamber to control rise of liquid therein and flow therefrom, there is illustrated in the present instance extending from the bottom of the record chamber a tube 36 terminating in an orifice 37 having a restricted opening through which flow takes place from the record chamber at a slower rate than that at which it enters through the siphon 24. Thus in the operation of the device the liquid level will rise to an intermediate portion of the sheet 34 and, as delivery through the siphon 24 ceases, the liquid level will drop by reason of flow through the orifice 37 into the receiving chamber 8.

The partition 39 between the record and receiving chambers is provided with an opening 38 into which is threaded a tube 40 extending upwardly through the record chamber, spaced from its wall, and terminating adjacent the annular groove 28 in the bottom 26 of the intermediate chamber. The end 42 of the tube 40 is preferably restricted so that when the instrument is inverted flow through the tube 40 occurs substantially slower than flow through the tube 30.

To avoid spoiling of the record sheet 34 upon return flow of the liquid, there is provided a baffle member in the form of a cone 41 resting on a ledge in the record chamber below the bottom of the record sheet 34. The tube 40 passes through an eccentric opening 43 in this ring which may be held in position by a suitable set screw. The opening 43 through which the tube 40 passes is slightly larger than the tube providing a loose fit, so that leakage of liquid may occur along the tube, as will be more evident from the following description of the operation. This opening also serves as an air vent in the operation.

The proper relative dimensions of the various chambers will be apparent from a consideration of the Winn patent and the operation described below. It may be noted, however, that preferably the orifice 37 is spaced both from the top and from the bottom of the chamber 8 by a distance greater than the maximum height of the liquid accumulating therein, so that when the instrument is either upright or inverted the orifice is above the level of liquid in this chamber.

In the first operation of this apparatus ink or dye may be introduced into the supply chamber through the top thereof and through the screen 11. This initial operation may be merely a test operation, and the liquid will pass through successive portions of the apparatus in a fashion which will be evident from the disclosure of said Winn patent and need not be particularly described herein. It need only be remarked that in this operation of making a record the tubes 22, 30 and 40 merely serve for the venting of air from one chamber to another while the portion of the record chamber below baffle 41 is vented through opening 43. Ultimately the liquid will be located in the receiving chamber 8, with the excess remaining in the intermediate chamber 4, which will have discharged only once into the record chamber, the liquid being supplied in such amount as not to cause a second rise of the liquid level to the bend of the siphon 24.

The bottom of chamber 8 is preferably closed by a weak diaphragm 44 which will break and prevent more serious damage to the instrument if the protective casing happened to fail while the instrument was in mud under high pressure. This is necessary, since the chambers are not vented into the protective casing as in the Winn instrument.

If desired, the instrument may now be taken apart to open the record chamber and replace the sheet 34 with a clean one, the liquid at this time remaining in chambers 4 and 8, as just indicated. The instrument may be kept in upright position until the time for its next use, when, depending upon the conditions encountered, a proper orifice 18 may be inserted in the bottom of the supply chamber 2.

To make the instrument ready for operation, it may then be inverted. When inversion occurs, the liquid in the chamber 8 will be located below the orifice 37 with a possibility that at most only a few drops would enter the orifice and pass into the tube 36. The liquid from the chamber 8 will flow through the tube 40 and air will be vented into the chamber 8 through the orifice 37. If any drops of liquid are in the tube 36, they will fall either into or about the end 27 of the siphon 24, in the latter case running down the outside of this tube. The tube 40, by reason of its restriction 42, will deliver the liquid moderately slowly into the record chamber 6, from which it will flow more rapidly through the tube 30. Accordingly, there is avoided a rise of liquid in the inverted instrument which might cause it to reach the record member 34. Drainage of the record chamber 6 is completed by reason of the provision of the groove 28 communicating with the tube 30.

The purpose of the baffle 41 is to catch any liquid which may flow on the sides of the chamber as the instrument is inverted. A few drops of liquid may result, for example, from slight amounts of liquid remaining in the tube 36 or lowermost portion of the chamber 6 below the ring 41. Any liquid thus caught by the ring 41 and by the channel which it provides in inverted position, will be led to the opening 43 surrounding the tube 40, whereupon it will flow down the outside of the tube 40, by which it will be prevented from coming into contact with the sheet 34. Any liquid which might happen to drop down through the central opening in the ring 41 about the long leg of the siphon will, of course, either fall directly to the top of the record chamber without marring the record sheet or will follow the leg of the siphon.

The liquid delivered into the intermediate chamber 4 through the tube 30, as well as the liquid which had remained therein will flow by way of the tube 22 into the space between the screen 11 and the cap 12. The orifice 18 will, at this time, act as a vent. The liquid will pass through the screen 11 into the supply chamber, being strained or filtered in the course of its passage, so that the supply chamber will contain only filtered solution.

The instrument is now ready for operation upon a second inversion into its upright position. Any small amount of liquid which may be within the tube 22 at this time will then flow into the intermediate chamber 4. The upper end of the tube 30 is preferably displaced as indicated, so that the liquid cannot flow by accident into the upper vent of the tube 30 in the event that in assembling the instrument the tubes 30 and 32 might be accidentally aligned with each other.

It will be evident that the inversion of the instrument to return the liquid to the chamber 2 may be accomplished before removing a record if desired, or, as indicated above, may be accomplished after a record is removed and a new record sheet inserted.

It will be evident that the apparatus may be operated repeatedly merely by its inversion. Unless the orifice 18 must be replaced, it is only necessary to open the record chamber 6 for cleaning and replacement of the record sheet. Any sediment is isolated between the screen 11 and the cap 12. The screen may be cleaned at suitable intervals and the liquid replaced when its color content is exhausted or its volume is too much reduced.

What I claim and desire to protect by Letters Patent is:

1. A device for recording inclination of a well bore comprising a reservoir for holding a record making liquid, a chamber in which a record is to be made, a chamber for receiving liquid from the record chamber following the formation of a record, means for controlling flow from the reservoir into the record chamber, means for effecting return of the liquid from the receiving chamber to the reservoir upon inversion of the device, and means for straining the liquid during such return to remove any solid material therefrom.

2. A device for recording inclination of a well bore comprising a reservoir for holding a record making liquid, a chamber in which a record is to be made, a chamber for receiving liquid from the record chamber following the formation of a record, means for controlling flow from the reservoir into the record chamber including an intermediate chamber between the reservoir and the record chamber, and means for effecting return of the liquid from the receiving chamber to the reservoir upon inversion of the device, said last means effecting venting of the chambers during flow of the liquid to make a record, and including a tube extending upwardly within the reservoir and communicating at its lower end with the upper end of said intermediate chamber, and a second tube extending upwardly within the intermediate chamber and communicating at its lower end with the upper end of said record chamber, said tubes being out of alignment with each other so that liquid dropping from the first mentioned tube when the instrument is turned to upright position will not enter the second mentioned tube to pass to said record chamber.

DONALD HERING.